July 13, 1926.
C. L. WALKER
1,592,237
CRANK SHAFT FOR FOUR-CYLINDER ENGINES AND METHOD OF BALANCING SAME
Filed July 15, 1925
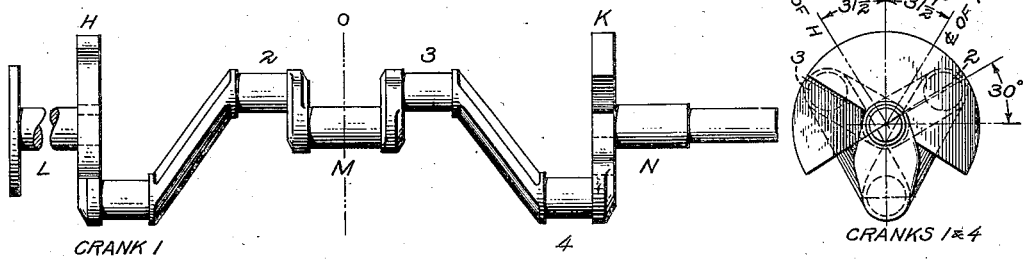
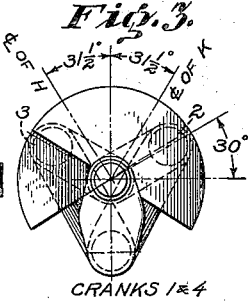
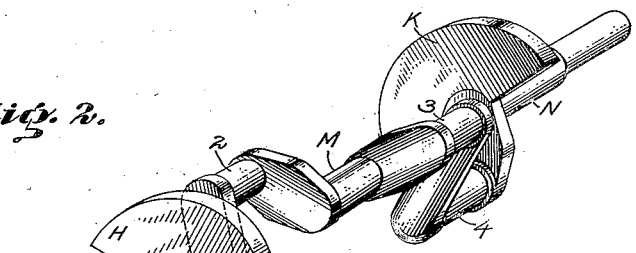
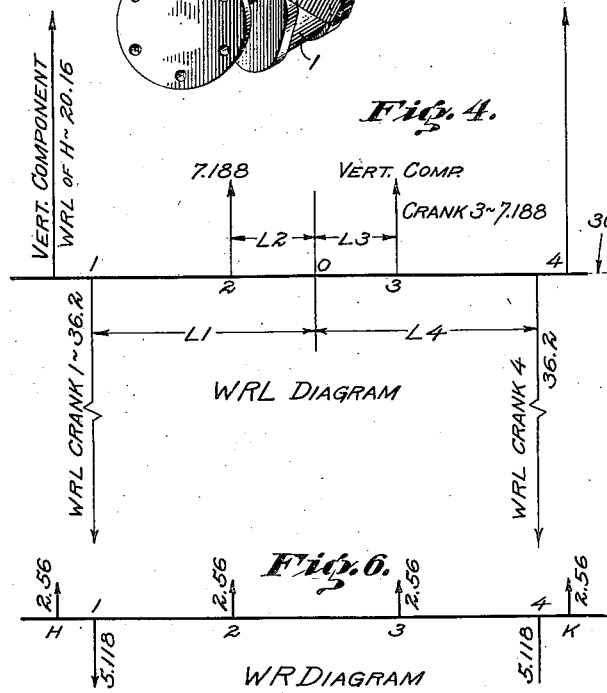
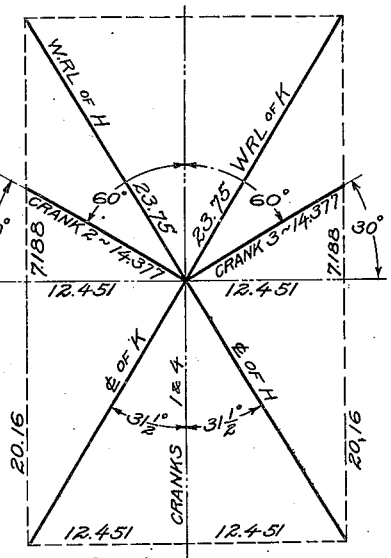
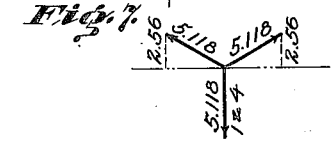
INVENTOR.
Clinton L. Walker
BY Dewey, Strong, Townsend & Loftus
ATTORNEYS.

Patented July 13, 1926.

1,592,237

UNITED STATES PATENT OFFICE.

CLINTON L. WALKER, OF PIEDMONT, CALIFORNIA.

CRANK SHAFT FOR FOUR-CYLINDER ENGINES AND METHOD OF BALANCING SAME.

Application filed July 15, 1925. Serial No. 43,704.

This invention relates to a crank shaft for four-cylinder engines of the vertical type, and to a method of counterbalancing such shafts both statically and dynamically.

The object of this invention is to produce a crank shaft that will eliminate a portion of the vibration in a conventional type of four-cylinder motor wherein the cranks are in one axial plane and symmetrically arranged on each half of the shaft. In the conventional type of shaft with throws in one axial plane it is well known that the secondary balance is very poor, causing excessive vibration at high engine speed. The secondary forces caused by the uneven acceleration of the pistons and the complex motion of the connecting rods act in unison in the same phase with regard to each other and at twice engine speed. This causes a serious vibration in the motor at twice the frequency of the vibrations due to the primary forces.

In this invention I have arranged the crank angles in such a way and have so proportioned the weights of the reciprocating masses that the secondary forces will be opposed to each other at angles of 120 degrees, thus dampening out the causes of the secondary vibrations. To accomplish this I have set cranks 1 and 4 in the same axial plane and in the same phase—that is, parallel to each other. Cranks 2 and 3, I have set at 120 degrees to each other and at 120 degrees to cranks 1 and 4.

One form which my invention may assume is exemplified in the following description and illustrated in the accompanying drawing, in which—

Fig. 1 shows a perspective view of a crank shaft embodying my invention;

Fig. 2 shows a plan view of the same;

Fig. 3 shows an end elevation;

Fig. 4 to Fig. 7 inclusive are diagrams illustrating the manner of computing the location and size of the counterbalancing weights.

In the drawing I show a four-throw crank shaft wherein the cranks are designated 1, 2, 3, and 4, respectively. Throws 1 and 4 are at opposite ends of the shaft and parallel to each other, and throws 2 and 3 are 120° apart, being also 120° from throws 1 and 4. Suitable bearings are provided as indicated at L, M, and N. Weights for counterbalancing the shaft both statically and dynamically are indicated at H and K.

It will be noted by reference to this diagram that whereas cranks 1 and 4 are parallel, their secondary forces will be similarly parallel and that they will be opposed at 120° to the secondary forces of cranks 2 and 3, and which are also opposed at 120° to each other. To preserve perfect secondary balance it is then necessary to make the weight of the reciprocating parts of cranks 1 and 4 equal to one-half the weight of the reciprocating parts of cranks 2 and 3.

With this crank arrangement, without counterbalances the primary balance would be imperfect and the shaft would not be statically balanced by the vertical components of cranks 2 and 3. This is shown in the diagrams, Figs. 4 to 7, where W equals the weight of the cranks or off-center masses, R equals the radius of the center of said masses, and L represents the distance of these masses from the central transverse axis O of the shaft. Cranks 1 and 4 have W times R products of 5.118 each opposed to the vertical components of 2 and 3 of 5.118 (cosine 60°), or 2.56. From this it appears that the vertical components of the counterbalance weights must have a W times R product of 5.118 to bring the shaft into static balance. This would be the limit of the vertical components of the counterbalances. It will be noted that cranks 2 and 3 have horizontal components opposed to each other and on each side of the central point O by the distances of $L_2$ and $L_3$ respectively. The W times R times L of 2 and 3 being each 14.377, their horizontal components will be 14.377 (cosine 30°) or 12.451, acting at the points 2 and 3 in opposite directions. By placing the counterbalances at the extreme end of the shaft their W times R times L product will be the maximum. The vertical component of the counterbalance H will be 2.56 times $L_1$ or 20.16. The amount and angular position of the counterbalances is then found by determining the resultant of the horizontal component of the W times R times L of 2, 12.451, and the vertical component of H and K respectively, amounting to 20.16. This is shown in the diagram to be 23.75 and at an angle of 31½ degrees from the bisector of the angle of 2 and 3. Knowing the W times R times L of each weight and the angle at which it is to be placed, the masses of the weights are easily determined by dividing by L, which gives the product of the weight times its radius mass center from the axis of the shaft. The weight can then be determined by the form and dimensions of the weight to be selected.

With the type of crank shown herein there are two firing intervals of 120° and two of 240°. This causes an overlapping in the suction strokes which results in uneven initial pressures at the beginning of the compression strokes. The two short intervals come consecutively so that the cylinder which is followed by the short intervals does not get the benefit of these overlapping suctions. To overcome this I may employ a duplex manifold and a duplex carburetor and connect the cylinders in such a way as to leave one suction to each manifold consecutively. A change is also necessary in the ignition distributor to meet the new firing intervals.

Having thus described my invention, what I claim as new and desire to secure by Letters Patent is:

1. A crank shaft for a four-cylinder straight type engine having cranks 1 and 4 aligned and cranks 2 and 3 arranged 120° from each other and from cranks 1 and 4.

2. A crank shaft for a four-cylinder straight type engine having cranks 1 and 4 aligned and cranks 2 and 3 arranged 120° from each other and from cranks 1 and 4, and counterbalancing weights for each half of the shaft, acting to produce a bending moment at the center of the shaft equal and opposite to the resultant bending moment of the two cranks adjacent thereto.

3. A crank shaft for a four-cylinder straight type engine having cranks 1 and 4 aligned and cranks 2 and 3 arranged 120° from each other and from cranks 1 and 4, and counterbalancing weights for each half of the shaft, acting to produce a bending moment at the center of the shaft equal and opposite to the resultant bending moment of the two cranks adjacent thereto, and weights formed in extension of the end webs of the crank shaft for balancing the shaft statically and dynamically.

4. A crank shaft for a four-cylinder straight type engine having cranks 1 and 4 aligned and cranks 2 and 3 arranged 120° from each other and from cranks 1 and 4, and counterbalancing weights for each half of the shaft, acting to produce a bending moment at the center of the shaft equal and opposite to the resultant bending moment of the two cranks adjacent thereto, and weights formed in extension of the end webs of the crank shaft for balancing the shaft statically and dynamically, said weights having their centers of gravity within the angle produced by the axial plane of each end crank and the next adjacent throw.

5. A method of reducing secondary vibration in a four-cylinder straight type engine, which consists of arranging cranks 1 and 4 in aligned relation and cranks 2 and 3 at 120° from each other and from cranks 1 and 4, and proportioning the masses of the reciprocating parts carried by the cranks so that the weight of the reciprocating masses of cranks 1 and 4, combined, equal the reciprocating mass of either of cranks 2 and 3.

6. A crank shaft for a four-cylinder straight type engine, having cranks 1 and 4 aligned and cranks 2 and 3 arranged 120° from each other and from cranks 1 and 4, and counterbalancing weights on each half of the shaft having their centers of gravity lying in axial planes at approximately $31\frac{1}{2}°$ from the axial plane of cranks 1 and 4 produced.

CLINTON L. WALKER.